United States Patent
Kabbinale et al.

(10) Patent No.: US 11,728,841 B2
(45) Date of Patent: Aug. 15, 2023

(54) METHOD AND APPARATUS FOR PROVIDING REGULATORY INFORMATION IN UWB SYSTEM

(71) Applicant: Samsung Electronics Co., Ltd., Suwon-si (KR)

(72) Inventors: Aniruddh Rao Kabbinale, Bangalore (IN); Ankur Bansal, Bangalore (IN); Karthik Srinivasa Gopalan, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/862,007

(22) Filed: Jul. 11, 2022

(65) Prior Publication Data

US 2022/0345174 A1     Oct. 27, 2022

Related U.S. Application Data

(63) Continuation of application No. 17/112,325, filed on Dec. 4, 2020, now Pat. No. 11,387,861.

(30) Foreign Application Priority Data

| Dec. 6, 2019 | (IN) | 201941050461 |
| Feb. 6, 2020 | (IN) | 202041005107 |
| Feb. 10, 2020 | (IN) | 202041005740 |
| Dec. 1, 2020 | (IN) | 201941050461 |

(51) Int. Cl.
*H04B 1/00* (2006.01)
*H04B 1/69* (2011.01)

(52) U.S. Cl.
CPC ..................... *H04B 1/69* (2013.01)

(58) Field of Classification Search
CPC ............ H04B 1/69; H04B 2201/71634; H04B 2201/71638; H04B 1/7163; H04W 4/50; H04W 4/80; H04W 16/14
USPC .......................................................... 375/130
See application file for complete search history.

(56) References Cited

U.S. PATENT DOCUMENTS

| 2004/0203762 A1 | 10/2004 | Liu et al. |
| 2006/0205354 A1 | 9/2006 | Pirzada et al. |
| 2007/0053333 A1 | 3/2007 | Pragada et al. |
| 2007/0248114 A1 | 10/2007 | Jia et al. |
| 2010/0003929 A1 | 1/2010 | Sohn et al. |
| 2011/0103301 A1 | 5/2011 | Mueck et al. |

(Continued)

FOREIGN PATENT DOCUMENTS

KR   10-2013-0072241 A   7/2013

OTHER PUBLICATIONS

European Search Report dated Aug. 23, 2022, issued in European Patent Application No. 20895920.5.

(Continued)

*Primary Examiner* — Helene E Tayong
(74) *Attorney, Agent, or Firm* — Jefferson IP Law, LLP

(57) ABSTRACT

In an embodiment, a method for providing regulatory information by a first device in an ultra-wide band (UWB) system is provided. The method includes indicating availability of the regulatory information to a second device; and providing the regulatory information to the second device based on the availability of the regulatory information, wherein the regulatory information includes at least one of a confidence level indicating a source of the regulatory information, a country code, a time stamp.

19 Claims, 11 Drawing Sheets

(56) References Cited

U.S. PATENT DOCUMENTS

| | | |
|---|---|---|
| 2011/0111780 A1 | 5/2011 | Hillan et al. |
| 2012/0046025 A1 | 2/2012 | Das et al. |
| 2013/0252657 A1 | 9/2013 | Kafle |
| 2015/0006429 A1 | 1/2015 | Staples |
| 2015/0146548 A1 | 5/2015 | Wang |
| 2016/0286458 A1 | 9/2016 | Rofougaran et al. |
| 2018/0227828 A1 | 8/2018 | Sirotkin et al. |

OTHER PUBLICATIONS

International Search Report dated Mar. 2, 2021, issued in International Application No. PCT/KR2020/017684.

METHOD AND APPARATUS FOR PROVIDING REGULATORY INFORMATION IN UWB SYSTEM

PRIORITY

This application is a continuation application of prior application Ser. No. 17/112,325, filed on Dec. 4, 2020, which is based on and claims priority under 35 U.S.C. § 119(a) of an Indian Application Number 201941050461, filed on Dec. 6, 2019, in the Indian Intellectual Property Office, of an Indian Application Number 202041005107, filed on Feb. 6, 2020, in the Indian Intellectual Property Office, of an Indian Application Number 202041005740, filed on Feb. 10, 2020, in the Indian Intellectual Property Office, and of an Indian Application Number 201941050461, filed on Dec. 1, 2020, in the Indian Intellectual Property Office, the disclosure of each of which is incorporated by reference herein in its entirety.

TECHNICAL FIELD

The present disclosure relates to an Ultra-Wide Band (UWB) system, and more specifically related to a method and an apparatus for providing regulatory information in the UWB system.

BACKGROUND

In a UWB system, a UWB device will support exchange of various messages between the UWB devices to allow ranging. In order to allow the UWB devices to interoperate, there is need to define a basic set of states in the UWB system, and define which basic set of messages are allowed in each state in the UWB system. The current UWB system being developed does not support or define these states and messages and their relationship. This results in continuously exchanging messages between the UWB devices in the UWB system and wasting resources in the UWB system.

Further, the UWB device should adhere to UWB transmission regulatory norms defined by a regulatory authority in the UWB device current geography/location to ensure legal compliance. Currently no existing method to ensure a UWB regulatory information is provided to the UWB device. Further, there is no mechanism for one UWB device to communicate the UWB regulatory information to another UWB device during an Out of Band (OOB) connection and an in-band connection.

Thus, it is desired to address the above mentioned disadvantages or other shortcomings or at least provide a useful alternative.

SUMMARY

The embodiments herein is to provide a method and a system for handling one or more UWB state, one or more UWB message, and one or more UWB regulatory information for enabling interoperable communication in a UWB system. This results in exchanging messages between the UWB devices in the UWB system in a proper manner and avoiding resource wastages in the UWB system.

The embodiments herein is to configure a basic set of states to allow interoperability between the UWB devices in the UWB system.

The embodiments herein is to configure messages that are allowed in a particular state to allow interoperability between the UWB devices in the UWB system.

The embodiments herein is to configure messages that is not allowed in a particular state to allow interoperability between the UWB devices in the UWB system.

The embodiments herein is to handle UWB regulatory information in a UWB system by configuring a UWB regulatory information, indicating, an availability of the UWB regulatory information to one or more second UWB device, and sharing the UWB regulatory information to the one or more second UWB device. Hence, the UWB device adheres to UWB transmission regulatory norms defined by a regulatory authority in the UWB device current geography/location to ensure legal compliance.

In an embodiment, a method for providing regulatory information by a first device in an ultra-wide band (UWB) system is provided. The method includes indicating availability of the regulatory information to a second device; and providing the regulatory information to the second device based on the availability of the regulatory information, wherein the regulatory information includes at least one of a confidence level indicating a source of the regulatory information, a country code, a time stamp of the regulatory information, and a list of regulatory channel and power information element.

In an embodiment, a first device in an ultra-wide band (UWB) system is provided. The first device includes a transceiver; and at least one processor configured to indicate availability of the regulatory information to a second device, and control the transceiver to provide the regulatory information to the second device based on the availability of the regulatory information, wherein the regulatory information includes at least one of a confidence level indicating a source of the regulatory information, a country code, a time stamp of the regulatory information, and a list of regulatory channel and power information element.

In an embodiment, a second device in an ultra-wide band (UWB) system is provided. The second device includes a transceiver; and at least one processor configured to identify availability of the regulatory information indicated by a first device, and control the transceiver to obtain the regulatory information from the first device based on the availability of the regulatory information, wherein the regulatory information includes at least one of a confidence level indicating a source of the regulatory information, a country code, a time stamp of the regulatory information, and a list of regulatory channel and power information element.

In an embodiment, a method for enabling interoperable communication in a UWB system is provided. The method includes configuring, by a first UWB device, at least one UWB state of the first UWB device and at least one UWB message associated with the at least one UWB state for interoperability in the UWB system. Further, the method includes exchanging the at least one UWB message between the first UWB device and at least one second UWB device for interoperability in the UWB system.

In an embodiment, the at least one UWB state is an UWB idle state, an UWB configured state, an UWB ranging state, and an UWB provisioning required state.

In an embodiment, the UWB idle state represents whether at least one of the first UWB device is ready for ranging with the at least one second UWB device and the first UWB device is ready for getting configured for ranging with the at least one second UWB device.

In an embodiment, the UWB configured state represents whether the first UWB device is ready for ranging with the at least one second UWB device.

In an embodiment, the UWB ranging state represents that the first UWB device is actively ranging with the at least one second UWB device.

In an embodiment, the UWB provisioning required state represents that the first UWB device does not have valid information to be available for ranging or configured for ranging.

In an embodiment, the at least one UWB message is an UWB capability related message, an UWB configuration related message, an UWB session key information related message, and an UWB regulatory related message.

In an embodiment, the UWB capability related message is used to fetch UWB capabilities of the at least one second UWB device.

In an embodiment, the UWB capability related message is used to push the UWB capabilities to the at least one second UWB device.

In an embodiment, the UWB configuration related message is used to configure the at least one second UWB device with a UWB configuration to be used for ranging.

In an embodiment, the UWB session key information related message is used to configure session key information to be used for ranging.

In an embodiment, the UWB regulatory related message is configured to provide regulatory information to the at least one second UWB device, retrieve information from the at least one second UWB device, and push information to the at least one second UWB device.

In an embodiment, the method further includes configuring, by the first UWB device, a UWB regulatory information. The UWB regulatory information includes a geographic region identifier, an age of the UWB regulatory information, bands supported for the UWB regulatory information in a location, maximum transmit power restrictions in an allowed bands, and a confidence level of the UWB regulatory information. Further, the method includes indicating, by the first UWB device, an availability of the UWB regulatory information to at least one second UWB device.

In an embodiment, the method includes sharing, by the first UWB device, the UWB regulatory information to the at least one second UWB device.

In an embodiment, sharing, by the first UWB device, the UWB regulatory information to the at least one second UWB device includes establishing, by the first UWB device, a connection to the at least one second UWB device, receiving, by the first UWB device, a UWB regulatory information request from the at least one second UWB device, fetching, by the first UWB device, the UWB regulatory information based on the UWB regulatory information request, and sending, by the first UWB device, a UWB regulatory information response comprising the fetched UWB regulatory information to the at least one second UWB device.

In an embodiment, sharing, by the first UWB device, the UWB regulatory information to the at least one second UWB device includes receiving, by the first UWB device, a UWB regulatory information request from the at least one second UWB device during pre-connection, fetching, by the first UWB device, the UWB regulatory information based on the UWB regulatory information request, and sending, by the first UWB device, a UWB regulatory information response comprising the fetched UWB regulatory information to the at least one second UWB device.

In an embodiment, sharing, by the first UWB device, the UWB regulatory information to the at least one second UWB device includes establishing, by the first UWB device, a connection with the at least one second UWB device, and pushing, by the first UWB device, the UWB regulatory information to the at least one second UWB device based on the established connection.

In an embodiment, sharing, by the first UWB device, the UWB regulatory information to the at least one second UWB device includes pushing, by the first UWB device, the UWB regulatory information to the at least one second UWB device during pre-connection.

In an embodiment, sharing, by the first UWB device, the UWB regulatory information to the at least one second UWB device includes sharing, by the first UWB device, the UWB regulatory information comprising a confidence level to the at least one second UWB device, wherein the confidence level comprises a range of a confidence level or a user setting, satellite navigation system information, location service information, and configuration information via another UWB device.

In an embodiment, indicating, by the first UWB device, the availability of the UWB regulatory information to the at least one second UWB device includes performing one of: indicating whether the UWB regulatory information is available to be shared a pre-connection OOB by broadcasting at least one of an advertisement OOB, an Bluetooth low energy (BLE) advertisement, an extended advertisement, and a scan request and response, and indicating whether the UWB regulatory information is available to be shared post-connection OOB/in-band.

In an embodiment, an information element (IE) of the UWB regulatory information in the pre-connection OOB comprises at least one of a confidence level, an indicator for outdoor transmission permission, a country code, an EPOCH time stamp of the UWB regulatory information, and a list of regulatory channel and power information element. In an embodiment, the regulatory channel and power information element comprises a first channel allowed, a number of consecutive channels allowed, and a maximum power of transmission. In another embodiment, the regulatory channel and power information element comprises a channel number and a maximum power of transmission.

In an embodiment, an information element (IE) of the UWB regulatory information in the post-connection OOB/in-band comprises at least one of a confidence level, an indicator for outdoor transmission permission, a country code, an EPOCH time stamp of the UWB regulatory information, a list of regulatory channel and power information element, and a number of elements of regulatory channel and power IE. In an embodiment, the regulatory channel and power information element comprises a first channel allowed, a number of consecutive channels allowed, and a maximum power of transmission. In another embodiment, the regulatory channel and power information element comprises a channel number and a maximum power of transmission In an embodiment, a first UWB device for enabling interoperable communication in a UWB system is provided. The first UWB device includes a processor coupled with a memory. The processor configures at least one UWB state of the first UWB device and at least one UWB message associated with the at least one UWB state to exchange the at least one UWB message between the first UWB device and at least one second UWB device for interoperability in the UWB system. The processor configures a UWB regulatory information. The UWB regulatory information includes a geographic region identifier, an age of the UWB regulatory information, bands supported for the UWB regulatory information in a location, maximum transmit power restrictions in an allowed bands, and a confidence level of the UWB regulatory information. Further, the processor indicates an availability of the UWB regulatory information to at least one second UWB device. Further, the processor is configured to: share the UWB regulatory information to the at least one second UWB device.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein, and the embodiments herein include all such modifications.

BRIEF DESCRIPTION OF THE DRAWINGS

The method and the UWB device are illustrated in the accompanying drawings, throughout which like reference letters indicate corresponding parts in the various figures. The embodiments herein will be better understood from the following description with reference to the drawings, in which.

DETAILED DESCRIPTION

Figure 1:
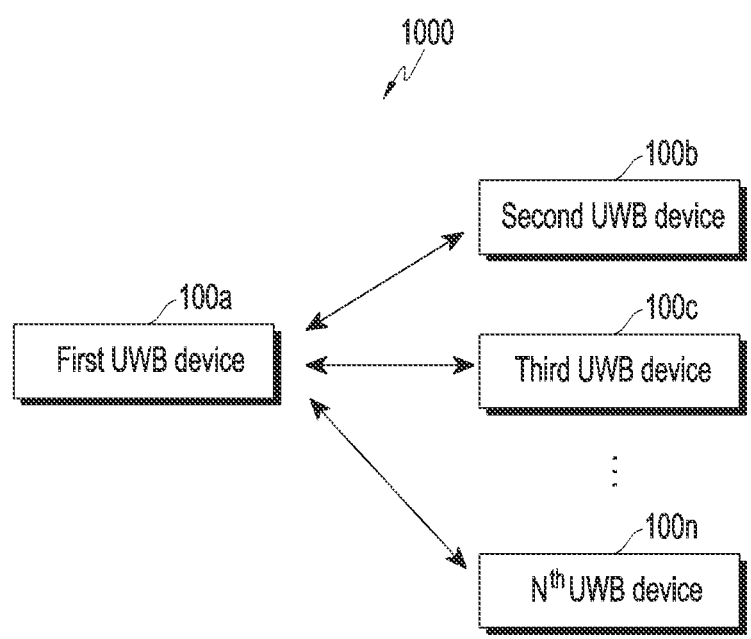
FIG. 1 illustrates an overview of an UWB system for handling UWB states, UWB messages, and UWB regulatory information for enabling interoperable communication in the UWB system, according to embodiments as disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Accordingly, the embodiments herein provide a method for enabling interoperable communication in a UWB system. The method includes configuring, by a first UWB device, at least one state of the first UWB device and at least one message associated with the at least one state to exchange the at least one message between the first UWB device and at least one second UWB device for interoperability in the UWB system. The method includes configuring, by the first UWB device, a UWB regulatory information. The UWB regulatory information includes a geographic region identifier, an age of the UWB regulatory information, bands supported for the UWB regulatory information in a location, maximum transmit power restrictions in an allowed bands, and a confidence level of the UWB regulatory information. Further, the method includes indicating, by the first UWB device, an availability of the UWB regulatory information to at least one second UWB device.

The proposed method can be used to configure a basic set of states to allow interoperability between the UWB devices in the UWB system. The proposed method can be used to configure messages that are allowed in a particular state to allow interoperability between the UWB devices in the UWB system. The proposed method can be used to configure messages that is not allowed in a particular state to allow interoperability between the UWB devices in the UWB system. This results in exchanging messages between the UWB devices in the UWB system in a proper manner and avoiding resource wastages in the UWB system.

The proposed method can be used to handle UWB regulatory information in an UWB system by configuring a UWB regulatory information, indicating, an availability of the UWB regulatory information to one or more second UWB device, and sharing the UWB regulatory information to the one or more second UWB device, such that the UWB device adheres to UWB transmission regulatory norms defined by a regulatory authority in the UWB device current geography/location to ensure legal compliance.

Referring now to the drawings, and more particularly to FIGS. 1 through 13, where similar reference characters denote corresponding features consistently throughout the figures, there are shown preferred embodiments.

FIG. 1 illustrates an overview of an UWB system (1000) for handling one or more UWB state, one or more UWB message, and one or more UWB regulatory information for enabling interoperable communication in the UWB system (1000), according to embodiments as disclosed herein. The UWB system (1000) includes a first UWB device (100*a*) and one or more second UWB devices (100*b*-100*n*). The first UWB device (100*a*) is communicated with one or more second UWB devices (100*b*-100*n*). The first UWB device (100*a*) and the one or more second UWB devices (100*b*-100*n*) can be, for example, but not limited to a cellular phone, a smart phone, a Personal Digital Assistant (PDA), a wireless modem, a tablet computer, a laptop computer, a Universal Serial Bus (USB) dongle, an Internet of Things (IoT) device, a virtual reality device, a foldable device and an immersive system.

The first UWB device (100*a*) configures one or more UWB state of the first UWB device (100*a*) and one or more UWB message associated with the one or more UWB state to exchange the one or more UWB message between the first UWB device (100*a*) and one or more second UWB devices (100*b*-100*n*) for interoperability in the UWB system (1000). The UWB state can be, for example, but not limited to a UWB idle state, a UWB configured state, a UWB ranging state, and a UWB provisioning required state. The UWB message can be, for example, but not limited to a UWB capability related message (i.e., CMD_UWB_CAPABILITY message), a UWB configuration related message (i.e., CMD_UWB_CONFIGURATION message), a UWB session key information related message (i.e., CMD_SESSION_KEY_INFO message), and a UWB regulatory related message (i.e., CMD_UWB_REGULATORY message).

Figure 4:
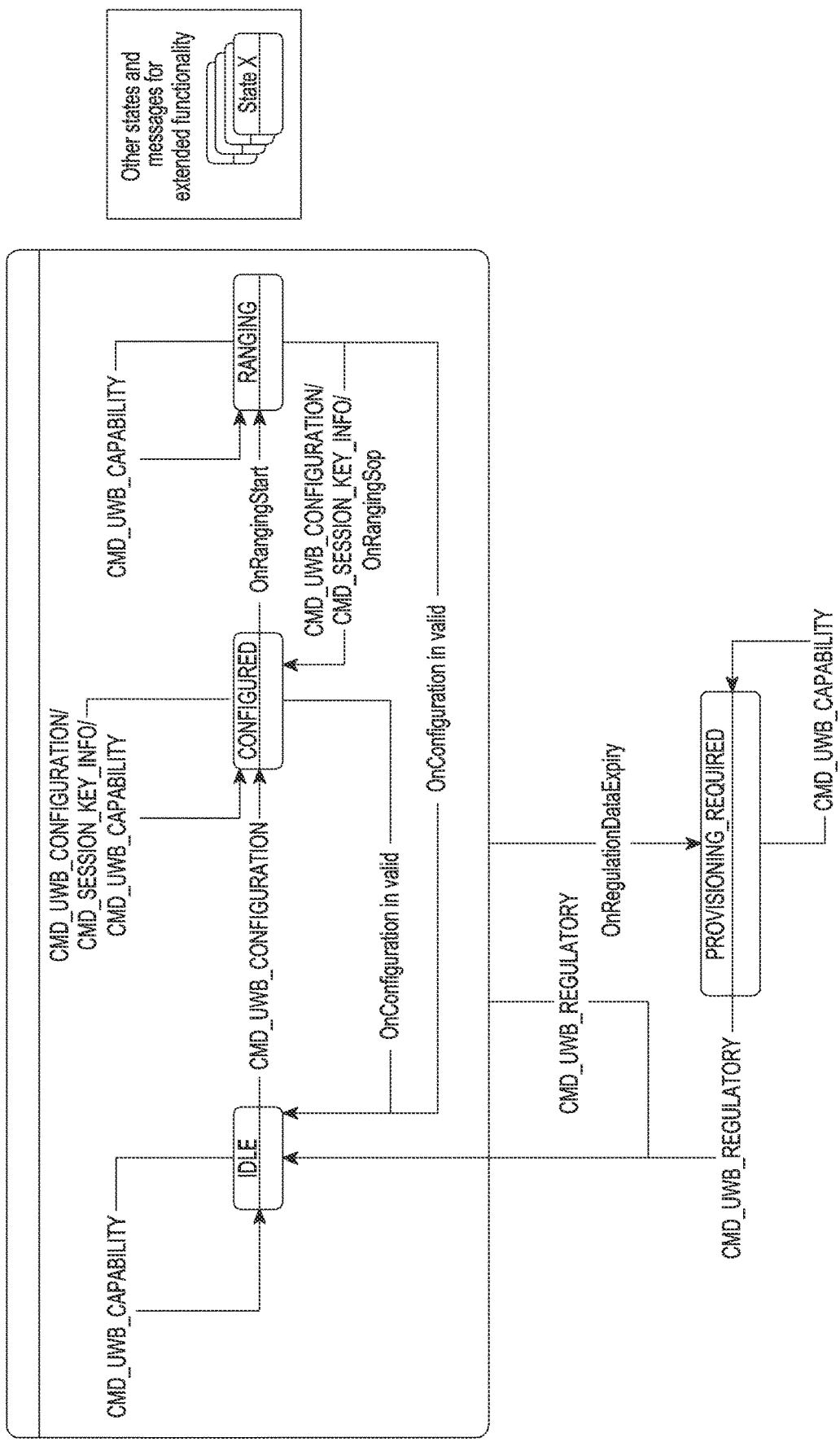
FIG. 4 and FIG. 5 illustrate a state transition diagram depicting states and messages defined by the UWB system, according to an embodiment of the present disclosure.
Figure 5:
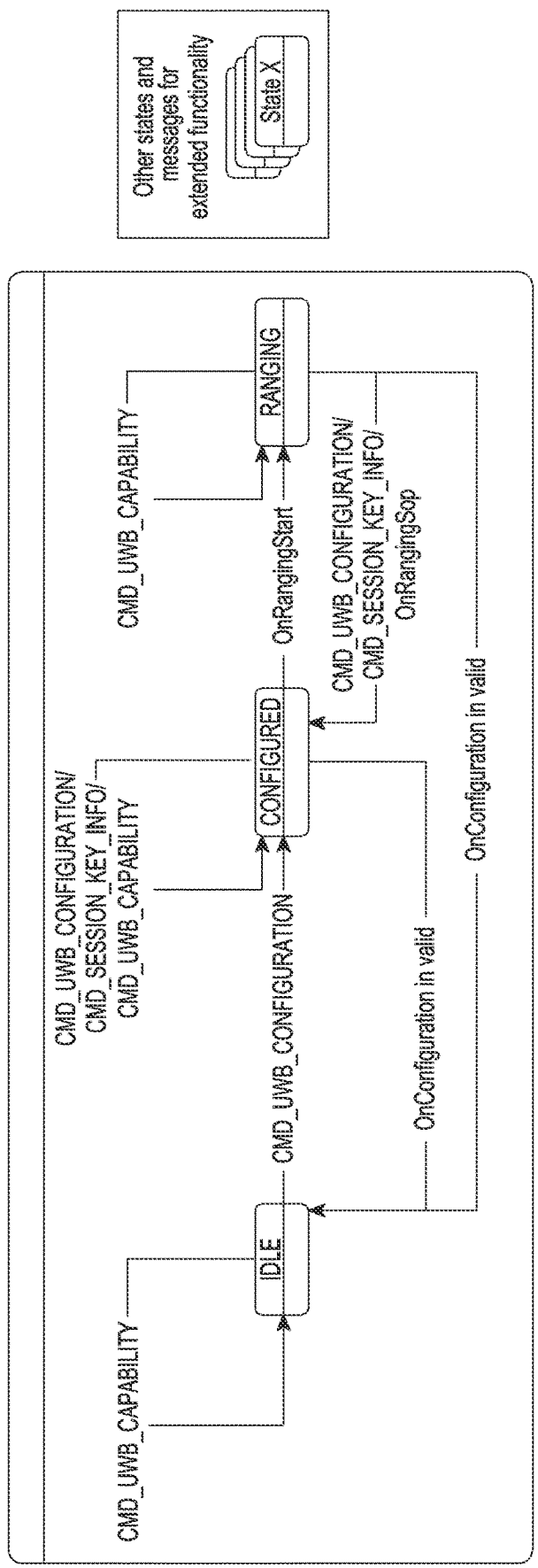

Various states and various messages related information is explained in FIG. 4 and FIG. 5. The state transition diagram depicting the states (i.e., UWB idle state, UWB configured state, UWB ranging state, and UWB provisioning required state) are explained in the FIG. 4. The state transition diagram depicting the states (i.e., UWB idle state, UWB configured state, and the UWB ranging state) are explained in the FIG. 5.

In an embodiment, the UWB idle state represents whether at least one of the first UWB device (100*a*) is ready for ranging with the one or more second UWB devices (100*b*-100*n*) and the first UWB device (100*a*) is ready for getting configured for ranging with the one or more second UWB devices (100*b*-100*n*). In the UWB idle state, the UWB capability related message, the UWB configuration related message, and the UWB regulatory related message are allowed. The UWB session key information related message is not allowed in the idle state.

In the UWB idle state, the UWB configuration related message can be used to configure the UWB device (100*a*-100*n*). This transitions the first UWB device (100*a*) into a configured state. The UWB regulatory related message can be used to update UWB regulatory information of the UWB device (100*a*-100*n*). If the regulatory information expires, in any of the states, the first UWB device (100*a*) transitions to a provisioning required state.

In an embodiment, the UWB configured state represents whether the first UWB device (100*a*) is ready for ranging with the one or more second UWB devices (100*b*-100*n*). In the UWB configured state, the UWB capability related message, the UWB configuration related message, the UWB regulatory related message, and the session key information related message are allowed. In the configured state, the UWB session key information related message can be used to configure a session key to be used for ranging if required. When ranging is required to be performed, OnRangingStart or some equivalent message/event is triggered to start the ranging. This transitions the first UWB device (100*a*) into the ranging state. If configuration to be used for ranging becomes invalid, the transitions of the first UWB device (100*a*) to the idle state.

In an embodiment, the UWB ranging state represents that the first UWB device (100*a*) is actively ranging with the one or more second UWB devices (100*b*-100*n*). In the UWB ranging state, the UWB capability related message, the UWB configuration related message, the UWB regulatory related message and the UWB session key information related message are allowed. When ranging is required to be stopped, or when ranging finishes, OnRangingStop or some equivalent message/event can be used to trigger transitioning the UWB device (100*a*-100*n*) into the configured state. The UWB configuration related message and the session key information related message move the first UWB device (100*a*) to the configured state. If configuration being used for ranging becomes invalid, the UWB device transitions to the idle state.

In an embodiment, the UWB provisioning required state represents that the first UWB device (100*a*) does not have valid information to be available for ranging or configured for ranging. In the UWB provisioning required state, the UWB capability related message and the UWB regulatory related message are allowed. The UWB session key information related message and the UWB configuration related message are not allowed in the provisioning required state. The UWB device (100a-100n) can be updated with new regulatory information using UWB regulatory related message. This transitions the UWB device (100a) into the UWB idle state.

In an embodiment, the UWB capability related message is used to fetch UWB capabilities of the one or more second UWB devices (100b-100n). In an embodiment, the UWB capability related message is used to push the UWB capabilities to the at least one second UWB device.

In an embodiment, the UWB configuration related message is used to configure the one or more second UWB devices (100b-100n) with a UWB configuration to be used for ranging.

In an embodiment, the UWB session key information related message is used to configure the one or more second UWB devices (100b-100n) with a session key information to be used for ranging.

In an embodiment, the UWB regulatory related message is used to provide regulatory information to the one or more second UWB devices (100b-100n), retrieve information from the one or more second UWB devices (100b-100n), and push information to the one or more second UWB devices (100b-100n).

Further, there may be more states defined by the UWB system (1000) for extended functionality or implementation. Similarity, there may be more messages defined by the UWB system (1000) for extended functionality or implementation.

Further, in case the connection is destroyed or disturbed, the UWB system (1000) can re-establish the connection whenever required. The messages may be exchanged in-band if required, if the UWB system (1000) is sufficiently configured to allow in-band communication.

The UWB system (1000) may be adapted to define a plurality of states including, but not limited to, "IDLE", "CONFIGURED", "RANGING", and "PROVISIONING_REQUIRED." As would be appreciated by a person skilled in the art, the UWB system (1000) may define more states to further extend functionalities, for example, based on the requirement, without departing from the scope of the present disclosure.

Further, the UWB system (1000) may be adapted to facilitate exchange of the plurality of messages or commands between multiple UWB devices (100a-100n). In an embodiment, the plurality of messages includes, but is not limited to, "CMD_UWB_CAPABILITY", "CMD_UWB_CONFIGURATION", "CMD_SESSION_KEY_INFO", and "CMD_UWB_REGULATORY". As would be appreciated by a person skilled in the art, the UWB system (1000) may define more messages to further extend functionalities, for example, based on the requirement, without departing from the scope of the present disclosure.

Further, the first UWB device (100a) configures a UWB regulatory information. The UWB regulatory information includes a geographic region identifier, an age of the UWB regulatory information, bands supported for the UWB regulatory information in a location, maximum transmit power restrictions in allowed bands, and a confidence level of the UWB regulatory information. The location can be, for example, but not limited to a zone, a region. The location can be defined by a service provider or a regulatory authority.

Further, the first UWB device (100a) indicates an availability of the UWB regulatory information to one or more second UWB devices (100b-100n). In an embodiment, the first UWB device (100a) indicates the availability of the UWB regulatory information as part of an advertisement OOB using one bit information. In an example, the availability of the UWB regulatory information is indicated as part of the advertisement OOB using one bit information as shown in the FIG. 6. In another embodiment, the first UWB device (100a) indicates the availability of the UWB regulatory information as part of a BLE advertisement using one bit information.

In another embodiment, the first UWB device (100a) indicates the availability of the UWB regulatory information as part of an extended advertisement using one bit information. In an example, the availability of the UWB regulatory information is indicated as part of the extended advertisement using one bit information as shown in the FIG. 7. In another embodiment, the first UWB device (100a) indicates the availability of the UWB regulatory information as part of a scan request and response using one bit information. The availability of the UWB regulatory information is indicated as part of the scan request and response using one bit information as shown in the FIG. 9.

In another embodiment, the first UWB device (100a) indicates whether the UWB regulatory information is available to be shared a pre-connection OOB using one bit information. In another embodiment, the first UWB device (100a) indicates whether the UWB regulatory information is available to be shared post-connection OOB or in-band using one bit information.

Further, the first UWB device (100a) shares the UWB regulatory information to the one or more second UWB devices (100b-100n). In an embodiment, the first UWB device (100a) is configured to share the UWB regulatory information to the one or more second UWB devices (100b-100n) by establishing a connection between the first UWB device (100a) and the one or more second UWB devices (100b-100n), receiving a UWB regulatory information request from the one or more second UWB devices (100b-100n), fetching the UWB regulatory information based on the UWB regulatory information request, and sending a UWB regulatory information response comprising the fetched UWB regulatory information to the one or more second UWB devices (100b-100n).

In another embodiment, the first UWB device (100a) is configured to share the UWB regulatory information to the one or more second UWB devices (100b-100n) by receiving a UWB regulatory information request from the one or more second UWB devices (100b-100n), fetching the UWB regulatory information based on the UWB regulatory information request, and sending a UWB regulatory information response comprising the fetched UWB regulatory information to the one or more second UWB devices (100b-100n).

In another embodiment, the first UWB device (100a) is configured to share the UWB regulatory information to the one or more second UWB devices (100b-100n) by establishing a connection with the one or more second UWB devices (100b-100n), and pushing the UWB regulatory information to the one or more second UWB devices (100b-100n) based on the established connection. In another embodiment, the first UWB device (100a) is configured to share the UWB regulatory information to the one or more second UWB devices (100b-100n) by pushing the UWB regulatory information to the one or more second UWB devices (100b-100n)

In another embodiment, the first UWB device (100a) is configured to share the UWB regulatory information to the one or more second UWB devices (100b-100n) by sharing the UWB regulatory information comprising a confidence level to the one or more second UWB devices (100b-100n). The confidence level includes A) a range of a confidence level and B) a user setting, satellite navigation system information, location service information, and configuration information via another UWB device (100*b*-100*n*).

Further, an information element (IE) of the UWB regulatory information in the pre-connection OOB includes a confidence level, reserved bits, an indicator for outdoor transmission permission, a country code, an EPOCH time stamp of the UWB regulatory information, and a list of regulatory channel and power information element. In an embodiment, the regulatory channel and power information element comprises a first channel allowed, a number of consecutive channels allowed, and a maximum power of transmission. In another embodiment, the regulatory channel and power information element includes a channel number and a maximum power of transmission. The EPOCH timestamp is a sequence of characters or bit information at which regulatory information was updated.

Bit information of the IE of the UWB regulatory information in the pre-connection OOB is depicted in the Table 1.

TABLE 1

| S. NO | Data element | Size in bits |
|---|---|---|
| 1 | Confidence level | 4 bits |
| 2 | Reserved bits | 3 bits |
| 3 | Indicator for outdoor transmission permission | 1 bit |
| 4 | Country code - ISO-3166-ALPHA-2 | 16 bits |
| 5 | EPOCH time stamp of configuration | 32 bits |
| 6 | List of regulatory channel and power information element | Variable (N * 24 bits) |

The Table 2A and Table 2B indicate contents of regulatory channel and power information element along with bit information.

TABLE 2A

Regulatory channel and power information Element

| S. NO | Data element | Size in bits |
|---|---|---|
| 1 | 1st channel allowed | 4 bits |
| 2 | Number of consecutive channels allowed | 4 bits |
| 3 | Maximum power of transmission | 16 bit |

TABLE 2B

Regulatory channel and power information Element

| S. NO | Data element | Size in bits |
|---|---|---|
| 1 | Channel number | 4 bits |
| 3 | Maximum power of transmission | 8 bit |

Further, an IE of the UWB regulatory information in the post-connection OOB or in-band includes a confidence level, reserved bits, an indicator for outdoor transmission permission, a country code, an EPOCH time stamp of the UWB regulatory information, a list of regulatory channel and power information element, and a number of elements of regulatory channel and power IE. The regulatory channel and power information element comprises a first channel allowed, a number of consecutive channels allowed, and a maximum power of transmission. In another embodiment, the regulatory channel and power information element includes a channel number and a maximum power of transmission.

TABLE 3

| S. No | Data element | Size in bits |
|---|---|---|
| 1 | Confidence level | 4 bits |
| 2 | Reserved bits | 3 bits |
| 3 | Indicator for outdoor transmission permission | 1 bit |
| 4 | Country code - ISO-3166-ALPHA-2 | 16 bits |
| 5 | EPOCH time stamp of configuration | 32 bits |
| 6 | Number of elements of regulatory channel and power IE | 8 bits |
| 7 | List of regulatory channel and power IE | Variable (N * 24 bits) |

The Table 4A and Table 4B indicate contents of regulatory channel and power information element along with bit information.

TABLE 4A

Regulatory channel and power information Element

| S. NO | Data element | Size in bits |
|---|---|---|
| 1 | 1st channel allowed | 4 bits |
| 2 | Number of consecutive channels allowed | 4 bits |
| 3 | Maximum power of transmission | 16 bit |

TABLE 4B

Regulatory channel and power information Element

| S. NO | Data element | Size in bits |
|---|---|---|
| 1 | Channel number | 4 bits |
| 3 | Maximum power of transmission | 8 bit |

In an embodiment, the confidence level is shared as part of regulatory information IE in direct form: min and max levels of confidence defined and value in the range [min, max] is transmitted. In another embodiment, the confidence level is shared as part of regulatory information IE in indirect form: By providing information of source of configuration, time of configuration to arrive at a confidence level.

Table 5 and Table 6 show the typical confidence level IE along with bit information. Table 5 indicates a direct form, and Table 6 indicates an indirect form which provides source of regulatory information as bitmask.

TABLE 5

| S. No | Data element | Size in bits |
|---|---|---|
| 1 | Confidence level | 4 |

TABLE 6

| S. NO | Data element | Size in bits |
|---|---|---|
| 1 | User setting | 1 bit |
| 2 | Based on satellite navigation system | 1 bit |
| 3 | Based on cellular system or other location services | 1 bit |
| 4 | Configured via another FiRa device | 1 bit |

Figure 2:
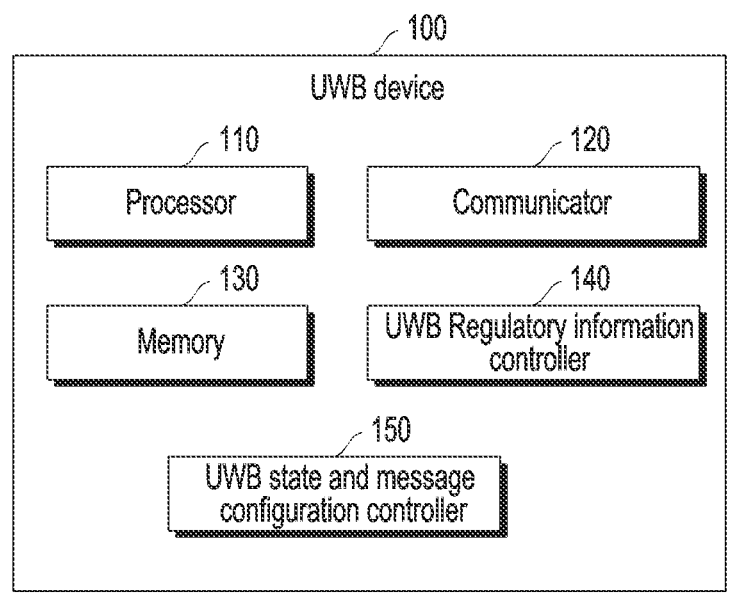
FIG. 2 illustrates a hardware component diagram of an UWB device for handling the UWB states, the UWB messages, and the UWB regulatory information in the UWB system, according to embodiments as disclosed herein.

FIG. 2 illustrates a hardware component diagram of the UWB device (100*a*-100*n*) for handling one or more UWB state, one or more UWB message, and one or more UWB regulatory information in the UWB system (1000), according to embodiments as disclosed herein. In an embodiment, the UWB device (100a-100n) includes a processor (110), a communicator (120), a memory (130), a UWB regulatory information controller (140) and a UWB state and message configuration controller (150). The processor (110) is coupled with the communicator (120), the memory (130), the UWB regulatory information controller (140) and a UWB state and message configuration controller (150).

The UWB regulatory information controller (140) is physically implemented by analog and/or digital circuits such as logic gates, integrated circuits, microprocessors, microcontrollers, memory circuits, passive electronic components, active electronic components, optical components, hardwired circuits and the like, and may optionally be driven by firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block.

The UWB state and message configuration controller (150) is physically implemented by analog and/or digital circuits such as logic gates, integrated circuits, microprocessors, microcontrollers, memory circuits, passive electronic components, active electronic components, optical components, hardwired circuits and the like, and may optionally be driven by firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block.

The a UWB state and message configuration controller (150) configures one or more UWB state of the first UWB device (100a) and one or more UWB message associated with the one or more UWB state to exchange the one or more UWB message between the first UWB device (100a) and the one or more second UWB devices (100b-100n) for interoperability in the UWB system (1000).

In an embodiment, by using the UWB state and message configuration controller (150), the UWB idle state represents whether at least one of the first UWB device (100a) is ready for ranging with the one or more second UWB devices (100b-100n) and the first UWB device (100a) is ready for getting configured for ranging with the one or more second UWB devices (100b-100n). In another embodiment, by using the UWB state and message configuration controller (150), the UWB configured state represents whether the first UWB device (100) is ready for ranging with the one or more second UWB devices (100b-100n).

In another embodiment, by using the UWB state and message configuration controller (150), the UWB ranging state represents that the first UWB device (100a) is actively ranging with the one or more second UWB devices (100b-100n). In another embodiment, by using the UWB state and message configuration controller (150), the UWB provisioning required state represents that the first UWB device (100a) does not have valid information to be available for ranging or configured for ranging.

The UWB regulatory information controller (140) configures the UWB regulatory information. Further, the UWB regulatory information controller (140) indicates the availability of the UWB regulatory information to one or more second UWB devices (100b-100n).

In an embodiment, the UWB regulatory information controller (140) indicates the availability of the UWB regulatory information as part of the extended advertisement using one bit information. In another embodiment, the UWB regulatory information controller (140) indicates the availability of the UWB regulatory information as part of the advertisement using one bit information. In another embodiment, the UWB regulatory information controller (140) indicates the availability of the UWB regulatory information as part of the scan request and response using one bit information.

In another embodiment, the UWB regulatory information controller (140) indicates whether the UWB regulatory information is available to be shared the pre-connection OOB using one bit information. In another embodiment, the UWB regulatory information controller (140) indicates whether the UWB regulatory information is available to be shared post-connection OOB or in-band using one bit information.

Further, the UWB regulatory information controller (140) shares the UWB regulatory information to the one or more second UWB devices (100b-100n). In an embodiment, the UWB regulatory information controller (140) is configured to share the UWB regulatory information to the one or more second UWB devices (100b-100n) by establishing the connection (e.g., BLE connection or the like) between the first UWB device (100a) and the one or more second UWB devices (100b-100n), receiving the UWB regulatory information request from the one or more second UWB devices (100b-100n), fetching the UWB regulatory information based on the UWB regulatory information request, and sending the UWB regulatory information response comprising the fetched UWB regulatory information to the one or more second UWB devices (100b-100n).

In another embodiment, the UWB regulatory information controller (140) is configured to share the UWB regulatory information to the one or more second UWB devices (100b-100n) by establishing the connection with the one or more second UWB devices (100b-100n), and pushing the UWB regulatory information to the one or more second UWB devices (100b-100n) based on the established connection.

In another embodiment, the UWB regulatory information controller (140) is configured to share the UWB regulatory information to the one or more second UWB devices (100b-100n) by sharing the UWB regulatory information comprising the confidence level to the one or more second UWB devices (100b-100n).

The processor (110) is configured to execute instructions stored in the memory (130) and to perform various processes. The communicator (120) is configured for communicating internally between internal hardware components and with external devices via one or more networks. The processor (110) may include one or more processing units (e.g., in a multi-core configuration). The processor (120) may include one or more processors. The processor (110) may be a general-purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU). The processor (120) may include multiple cores and is configured to execute the instructions stored in the memory (130).

The memory (130) stores instructions to be executed by the processor (110). The memory (130) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (130) may, in some examples, be considered a non-transitory storage medium. The term "non-transitory" may indicate that the storage medium is not embodied in a carrier wave or a propagated signal. However, the term "non-transitory" should not be interpreted that the memory (130) is non-movable. In certain examples, a non-transitory storage medium may store data that can, over time, change (e.g., in Random Access Memory (RAM) or cache).

Although the FIG. 2 shows various hardware components of the UWB device (100a-100n) but it is to be understood that other embodiments are not limited thereon. In other embodiments, the UWB device (100a-100n) may include less or more number of components. Further, the labels or names of the components are used only for illustrative purpose and does not limit the scope of the invention. One or more components can be combined together to perform same or substantially similar function for handling the UWB regulatory information in the UWB system (1000).

Figure 3A:
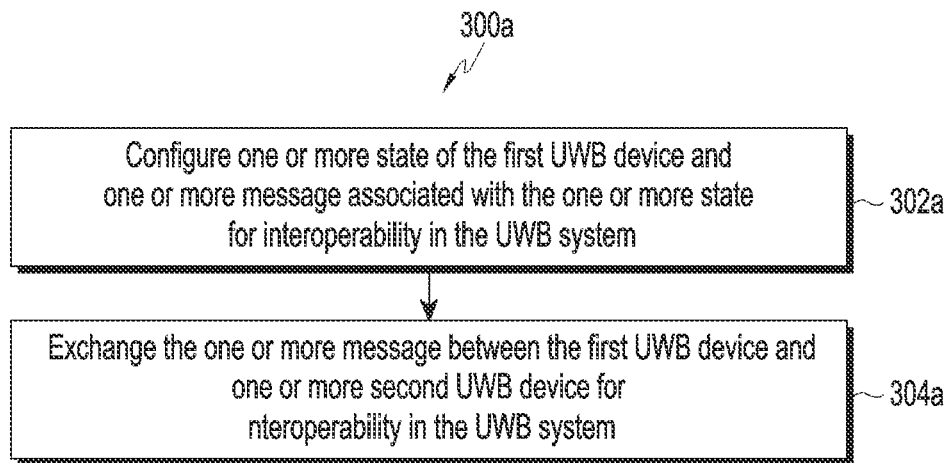
FIG. 3A is a flow chart illustrating a method for handling the UWB states and the UWB messages in the UWB system, according to embodiments as disclosed herein.

FIG. 3A is a flow chart (300a) illustrating a method for handling the UWB states and the UWB messages in the UWB system (1000), according to embodiments as disclosed herein. The operations (302a and 304a) are performed by the UWB state and message configuration controller (150). At 302a, the method includes configuring the one or more state of the first UWB device (300a) and the one or more message associated with the one or more state for interoperability in the UWB system (1000). At 304a, the method includes exchanging the one or more message between the first UWB device (300a) and the one or more second UWB devices (300b) for interoperability in the UWB system (1000). The method can be used to exchange the messages between the UWB devices (100a-100n) in the UWB system (1000) in a proper manner, so as to avoid the resource wastages in the UWB system (1000).

Figure 3B:
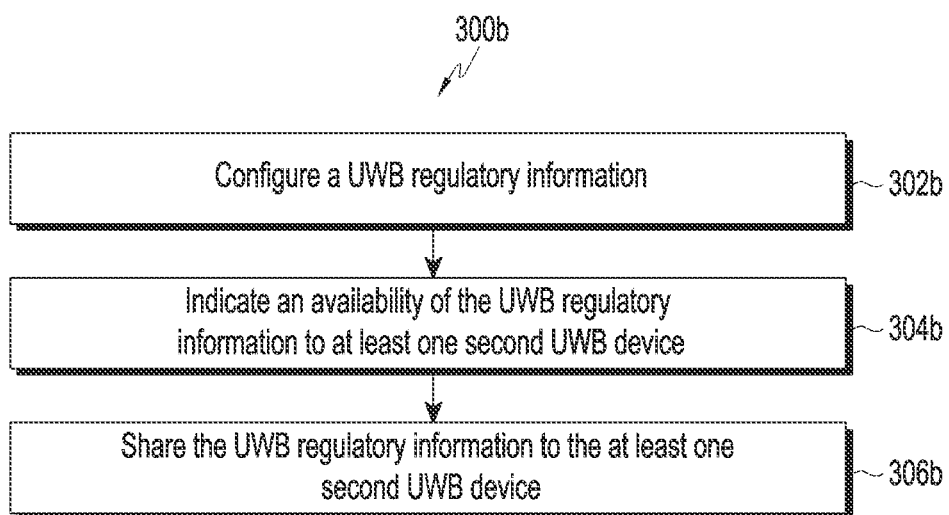
FIG. 3B is a flow chart illustrating a method for handling the UWB regulatory information in the UWB system, according to embodiments as disclosed herein.

FIG. 3B is a flow chart (300b) illustrating a method for handling the UWB regulatory information in the UWB system (1000), according to embodiments as disclosed herein. The operations (302b-306b) are performed by the UWB Regulatory information controller (140). At 302b, the method further includes configuring the UWB regulatory information. At 304b, the method includes indicating the availability of the UWB regulatory information to at least one second UWB device (100b-100n). At 306b, the method includes sharing the UWB regulatory information to the at least one second UWB device (100b-100n).

Based on the proposed methods, the UWB device (100a-100n) adheres to UWB transmission regulatory norms defined by a regulatory authority in the UWB device current geography/location to ensure legal compliance.

The various actions, acts, blocks, steps, or the like in the flow chart (300a and 300b) may be performed in the order presented, in a different order or simultaneously. Further, in some embodiments, some of the actions, acts, blocks, steps, or the like may be omitted, added, modified, skipped, or the like without departing from the scope of the invention.

Figure 6:
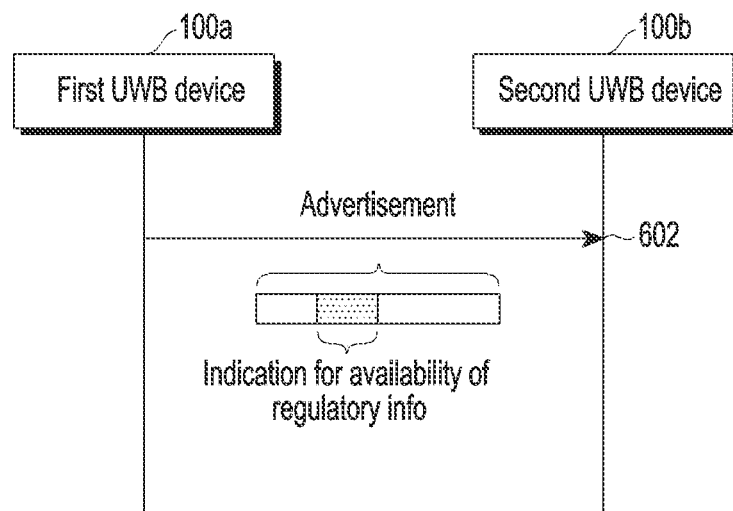
FIG. 6 is an example signalling diagram illustrating a first UWB device indicating the availability of the UWB regulatory information to a second UWB device as part of an advertisement, according to the embodiments as disclosed herein.

FIG. 6 is an example signalling diagram illustrating a first UWB device (100a) indicating the availability of the UWB regulatory information to a second UWB device (100b) as part of the advertisement, according to the embodiments as disclosed herein. At 602, the first UWB device (100a) indicates the availability of the UWB regulatory information to the second UWB device (100b) as part of an advertisement.

Figure 7:
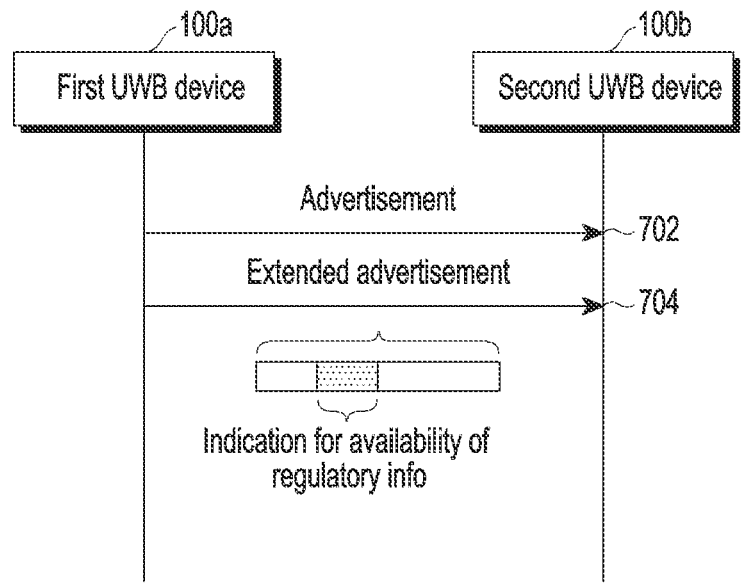
FIG. 7 is an example signalling diagram illustrating the first UWB device indicating the availability of the UWB regulatory information to the second UWB device as part of an extended advertisement, according to the embodiments as disclosed herein.

FIG. 7 is an example signalling diagram illustrating the first UWB device (100a) indicating the availability of the UWB regulatory information to the second UWB device (100b) as part of the extended advertisement, according to the embodiments as disclosed herein. At 702, the first UWB device (100a) sends the advertisement to the second UWB device (100b). At 704, the first UWB device (100a) indicates the availability of the UWB regulatory information to the second UWB device (100b) as part of the extended advertisement.

Figure 8:
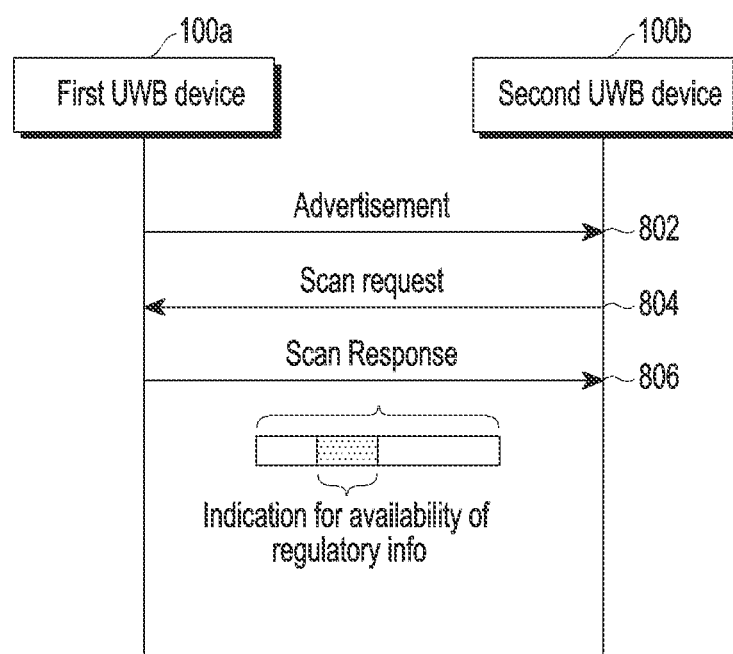
FIG. 8 is an example signalling diagram illustrating the first UWB device indicating the availability of the UWB regulatory information to the second UWB device as part of a scan request and response, according to the embodiments as disclosed herein.

FIG. 8 is an example signalling diagram illustrating the first UWB device (100a) indicating the availability of the UWB regulatory information to the second UWB device (100b) as part of the scan request and response, according to the embodiments as disclosed herein. At 802, the first UWB device (100a) sends the advertisement to the second UWB device (100b). At 804, based on the advertisement, the second UWB device (100b) sends the scan request to the first UWB device (100b). At 806, based on the scan request, the first UWB device (100a) indicating the availability of the UWB regulatory information to the second UWB device (100b) as part of the scan response.

Figure 9:
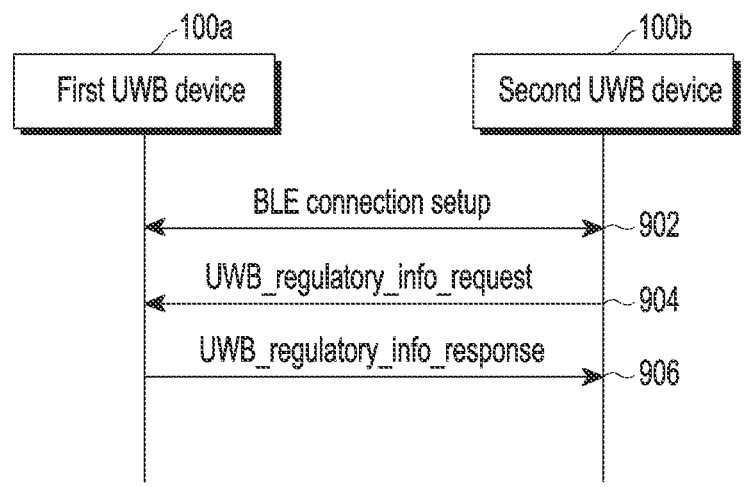
FIG. 9 is an example signalling diagram illustrating exchange of UWB regulatory information during a pre association or pre-connection, according to the embodiments as disclosed herein.

FIG. 9 is an example signalling diagram illustrating exchange of UWB regulatory information during the pre-association or pre-connection, according to the embodiments as disclosed herein. At 902, the BLE connection setup is between the first UWB device (100a) and the second UWB device (100b). At 904, the second UWB device (100b) sends a UWB_regulatory_info_request to the first UWB device (100a). Based on the UWB_regulatory_info_request, the first UWB device (100a) sends a UWB_regulatory_info_response to the second UWB device (100b).

Figure 10:
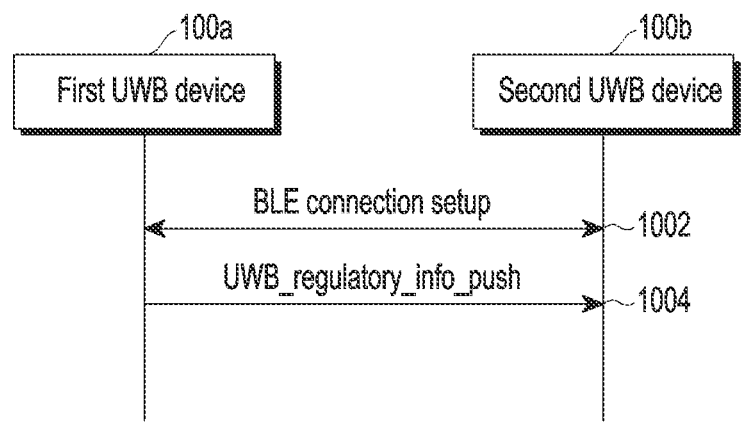
FIG. 10 is an example signalling diagram illustrating exchange of the UWB regulatory info during a post association or post-connection or in-band, according to the embodiments as disclosed herein.

FIG. 10 is an example signalling diagram illustrating exchange of the UWB regulatory information during the post association or post-connection or in-band, according to the embodiments as disclosed herein. At 1002, the BLE connection setup is between the first UWB device (100a) and the second UWB device (100b). At 1004, the first UWB device (100a) sends a UWB_regulatory_info_push to the second UWB device (100b) for exchanging the UWB regulatory information during the post association or post-connection or in-band.

Figure 11:
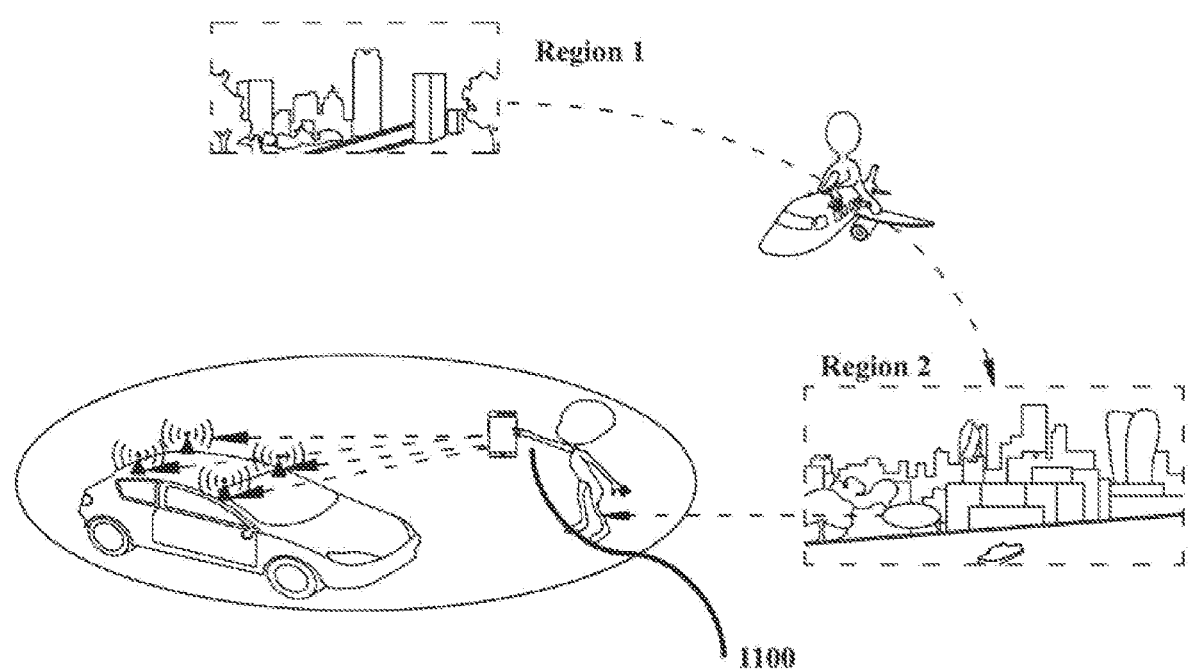
FIG. 11 is an example illustration in which a mobile device to unlock a rental car using a UWB based key, according to the embodiments as disclosed herein.

FIG. 11 is an example illustration in which the mobile device to unlock a rental car using a UWB based key, according to the embodiments as disclosed herein.

Referring to the FIG. 11, consider a conventional scenario, a user of the mobile device (1100) travels from a region 1 to a region 2. The user of the mobile device (1100) wishes to use a UWB based key in his/her mobile device (1100) to access a rental car in the region 2. The user of the mobile device (1100) doesn't have cellular connectivity in the region 2 and also the user of the mobile device (1100) also doesn't have any Wi-Fi connectivity in the parking lot. So, there is no means to get the UWB regulatory information. However, the user needs to adhere to the UWB regulatory norms for the region 2 but the user does not have the UWB regulatory information for the region 2.

Based on the proposed method, the smart phone (1100) fetches the UWB regulatory information by sending the UWB regulatory information request to the nearby UWB device. Based on the fetched UWB regulatory information, the user of the mobile device (1100) accesses the rental car in the region 2.

Figure 12:
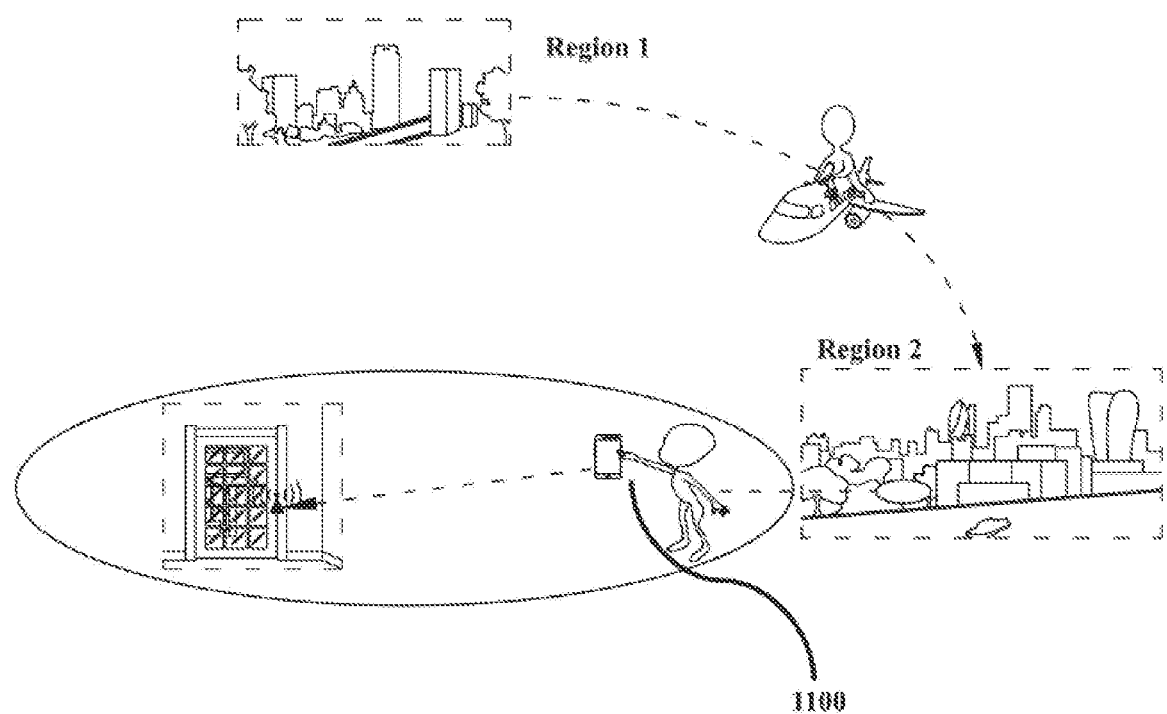
FIG. 12 is an example illustration in which a UWB based access key is used for opening a hotel room door, according to the embodiments as disclosed herein.

FIG. 12 is an example illustration in which a UWB based access key is used for opening a hotel room door, according to the embodiments as disclosed herein.

Referring to the FIG. 12 consider a conventional scenario, the user of the smart phone travels from the region 1 to the region 2. The user of the smart phone wishes to use the UWB based key in his/her smart phone to access hotel room in the region 2. The user of the smart phone doesn't have cellular connectivity and Wi-Fi connectivity in the region 2. The user of the smart phone needs to adhere to the UWB regulatory norms for the region 2. However, the user of the smart phone does not have the UWB regulatory information for the region 2.

Based on the proposed method, the smart phone (1100) fetches the UWB regulatory information by sending the UWB regulatory information request to the nearby UWB device. Based on the fetched UWB regulatory information, the user of the mobile device (1100) accesses the hotel room in the region 2.

Figure 13:
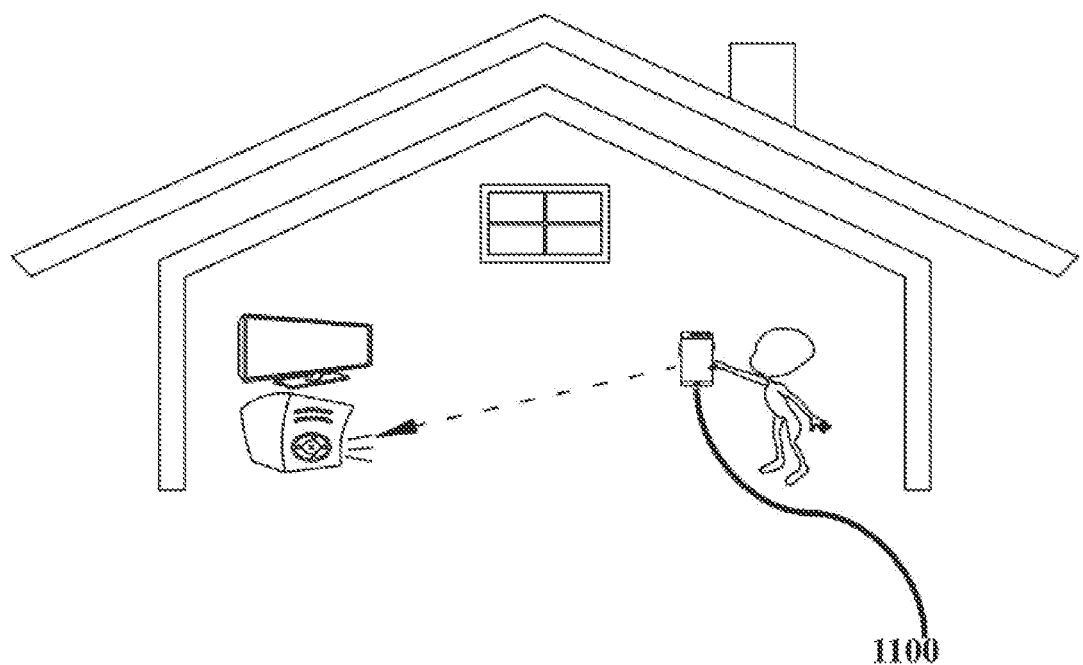
FIG. 13 is an example illustration in which a configured UWB regulatory information is on-boarding to new UWB device from old UWB device, according to the embodiments as disclosed herein.

FIG. 13 is an example illustration in which a configured UWB regulatory information is on-boarding to new UWB device from old UWB device, according to the embodiments as disclosed herein. Referring to the FIG. 13, consider a conventional scenario, the user buys a new speaker with a UWB module. The user's smart phone with a UWB chip and App installed (provided by manufacturer) can be used as a remote control for the speaker. However, the speaker is imported and does not have regulatory information for the UWB transmission in current geography unlike the user's smart phone which has the information already. Also, speaker does not have any other connectivity except with the remote control. For the UWB operation to be compliant legally, regulatory information needs to be given to the speaker. Based on the proposed method, the old UWB device pushes the UWB regulatory information to the new UWB device, so that the new UWB device can operate legally.

The embodiments disclosed herein can be implemented using network management functions running on at least one hardware device.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the embodiments as described herein.

What is claimed is:

1. A first device in an ultra-wide band (UWB) system, comprising:
a transceiver; and
at least one processor configured to control the transceiver to:
receive, from a second device, an out-of-band (OOB) message including indication information for an availability of UWB regulatory information,
transmit, to the second device, a request message for requesting UWB regulatory information based on the indication information, and
receive, from the second device, a response message including the UWB regulatory information as a response to the request message,
wherein the UWB regulatory information includes source information indicating a source of the UWB regulatory information, country code information, list information including a list of at least one regulatory channel and power information element, and number information indicating a number of the regulatory channel and power information element in the list information.

2. The first device of claim 1, wherein the indication information indicates whether the UWB regulatory information is available via an OOB.

3. The first device of claim 2, wherein, in case that the indication information indicates that the UWB regulatory information is available via OOB, the response message is received via the OOB.

4. The first device of claim 1, wherein the OOB message is one of an advertisement message, a bluetooth low energy (BLE) advertisement message, an extended advertisement message, a scan request message or a scan response message.

5. The first device of claim 1, wherein the regulatory channel and power information element includes channel information, and maximum power information.

6. The first device of claim 1, wherein the source information indicates one of a user setting, a satellite navigation system, a cellular system, and configuration via another device.

7. A second device in an ultra-wide band (UWB) system, comprising: a transceiver; and at least one processor configured to control the transceiver to: transmit an out-of-band (OOB) message including indication information for an availability of UWB regulatory information, receive, from the second device, a request message for requesting UWB regulatory information based on the indication information, and transmit, to the second device, a response message including the UWB regulatory information as a response to the request message, wherein the UWB regulatory information includes source information indicating a source of the UWB regulatory information, country code information, list information including a list of at least one regulatory channel and power information element, and number information indicating a number of the regulatory channel and power information element in the list information.

8. The second device of claim 7, wherein the indication information indicates whether the UWB regulatory information is available via an OOB.

9. The second device of claim 8, wherein, in case that the indication information indicates that the UWB regulatory information is available via OOB, the response message is transmitted via the OOB.

10. The second device of claim 7, wherein the OOB message is one of an advertisement message, a bluetooth low energy (BLE) advertisement message, an extended advertisement message, a scan request message or a scan response message.

11. The second device of claim 7, wherein the regulatory channel and power information element includes channel information, and maximum power information.

12. The second device of claim 7, wherein the source information indicates one of a user setting, a satellite navigation system, a cellular system, and configuration via another device.

13. A method performed by a first device in an ultra-wide band (UWB) system, the method comprising:

receiving, from a second device, an out-of-band (OOB) message including indication information for an availability of UWB regulatory information;

transmitting, to the second device, a request message for requesting UWB regulatory information based on the indication information; and receiving, from the second device, a response message including the UWB regulatory information as a response to the request message, wherein the UWB regulatory information includes source information indicating a source of the UWB regulatory information, country code information, list information including a list of at least one regulatory channel and power information element, and number information indicating a number of the regulatory channel and power information element in the list information.

14. The method of claim 13, wherein the indication information indicates whether the UWB regulatory information is available via an OOB.

15. The method of claim 14, wherein, in case that the indication information indicates that the UWB regulatory information is available via OOB, the response message is received via the OOB.

16. The method of claim 13, wherein the OOB message is one of an advertisement message, a bluetooth low energy (BLE) advertisement message, an extended advertisement message, a scan request message or a scan response message.

17. The method of claim 13, wherein the regulatory channel and power information element includes channel information, and maximum power information.

18. The method of claim 13, wherein the source information indicates one of a user setting, a satellite navigation system, a cellular system, and configuration via another device.

19. A method performed by a second device in an ultrawide band (UWB) system, the method comprising: transmitting an out-of-band (OOB) message including indication information for an availability of UWB regulatory information; receiving, from the second device, a request message for requesting UWB regulatory information based on the indication information; and transmitting, to the second device, a response message including the UWB regulatory information as a response to the request message, wherein the UWB regulatory information includes source information indicating a source of the UWB regulatory information, country code information, list information including a list of at least one regulatory channel and power information element, and number information indicating a number of the regulatory channel and power information element in the list information.

* * * * *